(12) United States Patent
Xun et al.

(10) Patent No.: US 11,282,476 B2
(45) Date of Patent: *Mar. 22, 2022

(54) DEFORMABLE ELECTRONIC DEVICE AND METHODS AND SYSTEMS FOR DISPLAY REMEDIATION TO COMPENSATE PERFORMANCE DEGRADATION

(71) Applicant: Motorola Mobility LLC, Chicago, IL (US)

(72) Inventors: Xiaodong Xun, Palatine, IL (US); Ye Yang, Prior Lake, MN (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,526

(22) Filed: Dec. 7, 2020

(65) Prior Publication Data

US 2021/0090522 A1  Mar. 25, 2021

Related U.S. Application Data

(63) Continuation of application No. 15/209,527, filed on Jul. 13, 2016, now Pat. No. 10,878,771.

(51) Int. Cl.
*G09G 5/00* (2006.01)
*H04M 1/02* (2006.01)
(Continued)

(52) U.S. Cl.
CPC ........... *G09G 5/003* (2013.01); *G06F 1/1618* (2013.01); *G06F 1/1626* (2013.01);
(Continued)

(58) Field of Classification Search
CPC .... G09G 5/003; G09G 3/035; G09G 2354/00; G09G 5/14; G09G 2320/0233;
(Continued)

(56) References Cited

U.S. PATENT DOCUMENTS 10,063,677 B2   8/2018   Cavallaro et al.
2002/0138767 A1  9/2002   Hamid
(Continued)

FOREIGN PATENT DOCUMENTS

CN   104850769   8/2015
EP    2500898    9/2012
(Continued)

OTHER PUBLICATIONS

Balduaf, Matthias et al., "KIBITZER: A wearable System for Eye-Gaze-based Mobile Urban Exploration", Published at Augmented hUman Conference; Apr. 2-3, 2010; Available online http://matthiasbaldauf.com/publications/Baldauf10b.pdf.
(Continued)

*Primary Examiner* — Jennifer Mehmood
*Assistant Examiner* — Kim Thanh T Tran
(74) *Attorney, Agent, or Firm* — Philip H. Burrus, IV

(57) ABSTRACT

An electronic device includes a flexible display that can be deformed at a deformation portion to partition the flexible display into a first portion and a second portion. One or more processors present content on the first portion of the flexible display and remediate the second portion of the flexible display to compensate performance degradation of the flexible display resulting from presenting content on the first portion of the flexible display.

20 Claims, 12 Drawing Sheets

(51) Int. Cl.
   *G06F 1/16*     (2006.01)
   *G09G 3/00*     (2006.01)
   *G09G 5/14*     (2006.01)

(52) U.S. Cl.
   CPC .......... *G06F 1/1652* (2013.01); *G06F 1/1694* (2013.01); *G09G 3/035* (2020.08); *H04M 1/0268* (2013.01); *G09G 5/14* (2013.01); *G09G 2320/0233* (2013.01); *G09G 2320/0242* (2013.01); *G09G 2354/00* (2013.01); *H04M 1/0214* (2013.01)

(58) Field of Classification Search
   CPC ........ G09G 2320/0242; H04M 1/0268; H04M 1/0214; G06F 1/1618; G06F 1/1626; G06F 1/1652; G06F 1/1694
   USPC ........................................................ 345/619
   See application file for complete search history.

(56) References Cited

U.S. PATENT DOCUMENTS

| | | |
|---|---|---|
| 2003/0172283 A1 | 9/2003 | O'Hara |
| 2007/0057935 A1 | 3/2007 | Takagi |
| 2007/0171921 A1 | 7/2007 | Wookey |
| 2008/0238610 A1 | 10/2008 | Rosenberg |
| 2009/0240940 A1 | 9/2009 | Shoemake et al. |
| 2011/0095974 A1 | 4/2011 | Moriwaki |
| 2011/0312311 A1 | 12/2011 | Abifaker et al. |
| 2013/0076663 A1 | 3/2013 | Sirpal et al. |
| 2014/0028435 A1 | 1/2014 | Brockway, III |
| 2014/0098095 A1* | 4/2014 | Lee .................. G09G 3/20 345/420 |
| 2014/0118317 A1 | 5/2014 | Song et al. |
| 2014/0160337 A1 | 6/2014 | Van Den Herik |
| 2014/0306985 A1* | 10/2014 | Jeong ................ G09G 5/06 345/601 |
| 2014/0320274 A1 | 10/2014 | De Schepper et al. |
| 2015/0022515 A1 | 1/2015 | Ikeda et al. |
| 2015/0042674 A1* | 2/2015 | Lin .................... G09G 5/14 345/619 |
| 2015/0081559 A1 | 3/2015 | Dua |
| 2015/0146387 A1 | 5/2015 | Lee |
| 2015/0177789 A1 | 6/2015 | Jinbo |
| 2015/0186636 A1 | 7/2015 | Tharappel |
| 2015/0227223 A1 | 8/2015 | Kang et al. |
| 2015/0286813 A1 | 10/2015 | Jakobsson |
| 2015/0301672 A1 | 10/2015 | Kim et al. |
| 2015/0338916 A1 | 11/2015 | Priyantha et al. |
| 2015/0348453 A1 | 12/2015 | Jin et al. |
| 2015/0358315 A1 | 12/2015 | Cronin |
| 2016/0021168 A1 | 1/2016 | Chaudhri et al. |
| 2016/0057139 A1 | 2/2016 | McDonough |
| 2016/0093240 A1* | 3/2016 | Aurongzeb .......... G09G 3/3225 345/590 |
| 2016/0267732 A1 | 9/2016 | Agrfioti et al. |
| 2017/0017313 A1 | 1/2017 | Rakshit |
| 2017/0047044 A1* | 2/2017 | Zheng ................ G09G 3/32 |
| 2017/0177096 A1 | 6/2017 | Cheong et al. |
| 2017/0185289 A1 | 6/2017 | Kim |
| 2017/0345365 A1 | 11/2017 | Li |
| 2018/0020349 A1 | 1/2018 | Tyagi |
| 2019/0007385 A1 | 1/2019 | Agrawal |

FOREIGN PATENT DOCUMENTS

| | | |
|---|---|---|
| EP | 2793214 | 10/2014 |
| WO | 2015016160 | 2/2015 |
| WO | 2015/187504 | 12/2015 |
| WO | 2015/195011 | 12/2015 |

OTHER PUBLICATIONS

Gee, Jason, "Final Office Action", U.S. Appl. No. 15/209,534, filed Jul. 13, 2016; dated Dec. 13, 2018.
Gee, Jason Kai Yin, "NonFinal OA", U.S. Appl. No. 15/209,524, filed Jul. 13, 2016; dated Jul. 6, 2018.
Gee, Jason Kai Yin, "NonFinal Office Action", U.S. Appl. No. 15/209,524, filed Jul. 13, 2016; dated Oct. 1, 2019.
Hauber, Jorg, "European Search Report", European Application No. EP 17179859; dated Oct. 9, 2017.
Kanaan, Simon, "NonFinal OA", U.S. Appl. No. 15/209,514, filed Jul. 13, 2016; dated Apr. 2, 2018.
Kanaan, Simon, "NonFinal Office Action", U.S. Appl. No. 15/209,514, filed Jul. 13, 2016; dated Dec. 13, 2018.
Kanaan, Simon, "Notice of Allowance", U.S. Appl. No. 15/209,514, filed Jul. 13, 2016; dated May 20, 2019.
Kanaan, Simon P., "NonFinal OA", U.S. Appl. No. 16/434,077, filed Jun. 6, 2019; dated Jun. 11, 2020.
Kanaan, Simon P, "Notice of Allowance", U.S. Appl. No. 16/434,077, filed Jun. 6, 2019; dated Jul. 23, 2020.
Karam, Tony, "Passwords: Make Way for Proximity Authentication", Published online on Mar. 2, 2018 at https://www.technative.io/passwords-make-way-for-proximity-authentication/.
Morris, Euros, "GB Search Report and Written Opinion", GB Application No. GB1710801.0; dated Dec. 20, 2017; Search Date Dec. 18, 2017.
Morris, Euros, "Great Britain Search Report", GB Application No. 1710801.0; dated Dec. 17, 2018.
Morris, Euros, "Office Action", GB1710801.0; dated Feb. 5, 2020.
Rashid, Harunur, "Final Office Action", U.S. Appl. No. 15/209,530, filed Jul. 13, 2016; dated Aug. 23, 2018.
Rashid, Harunur, "NonFinal OA", U.S. Appl. No. 15/209,530, filed Jul. 13, 2016; dated Feb. 22, 2018.
Rashid, Harunur, "Notice of Allowance", U.S. Appl. No. 15/209,530, filed Jul. 13, 2016; dated Jan. 25, 2019.
Saddington, Aaron, "GB Search and Written Opinion", GB Application No. GB1710820.0; dated Dec. 19, 2017.
Steckert, Markus, "Office Action", German Application No. 102017115316.0; dated Mar. 2, 2020.
Tran, Kim Than Thi, "Final Office Action", U.S. Appl. No. 15/209,519, filed Jul. 13, 2016; dated May 8, 2018.
Tran, Kim Thanh Thi, U.S. Appl. No. 15/209,527, filed Jul. 13, 2016; dated Dec. 12, 2017.
Tran, Kim Thanh Thi, "Final OA", U.S. Appl. No. 15/209,527, filed Jul. 13, 2016; dated Jul. 12, 2018.
Tran, Kim Thanh Thi, "Final Office Action", U.S. Appl. No. 15/209,519, filed Jul. 13, 2016; dated Mar. 5, 2019.
Tran, Kim Thanh Thi, "NonFinal OA", U.S. Appl. No. 15/209,519, filed Jul. 13, 2016; dated Aug. 27, 2018.
Tran, Kim Thanh Thi, "NonFinal OA", U.S. Appl. No. 15/209,519, filed Jul. 13, 2016; dated Oct. 17, 2017.
Zanglein, Ulrike, "PCT Search Report", PCT/US2017/041435 International Filing Date Jul. 11, 2017; dated Sep. 21, 2017.

* cited by examiner

DEFORMABLE ELECTRONIC DEVICE AND METHODS AND SYSTEMS FOR DISPLAY REMEDIATION TO COMPENSATE PERFORMANCE DEGRADATION

CROSS REFERENCE TO PRIOR APPLICATIONS

This application is a continuation application claiming priority and benefit under 35 U.S.C. § 120 from U.S. application Ser. No. 15/209,527, filed Jul. 13, 2016, which is incorporated by reference for all purposes.

BACKGROUND

Technical Field

This disclosure relates generally to electronic devices and corresponding methods, and more particularly to physically deformable electronic devices.

Background Art

Mobile electronic communication devices, such as smartphones, are used by billions of people. These users employ mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

These smaller, yet more powerful, devices are being used for many different applications in many different environments. It would be advantageous to have improved operating modes of an electronic device to adapt performance to a given environment, condition, or application.

Figure 1:
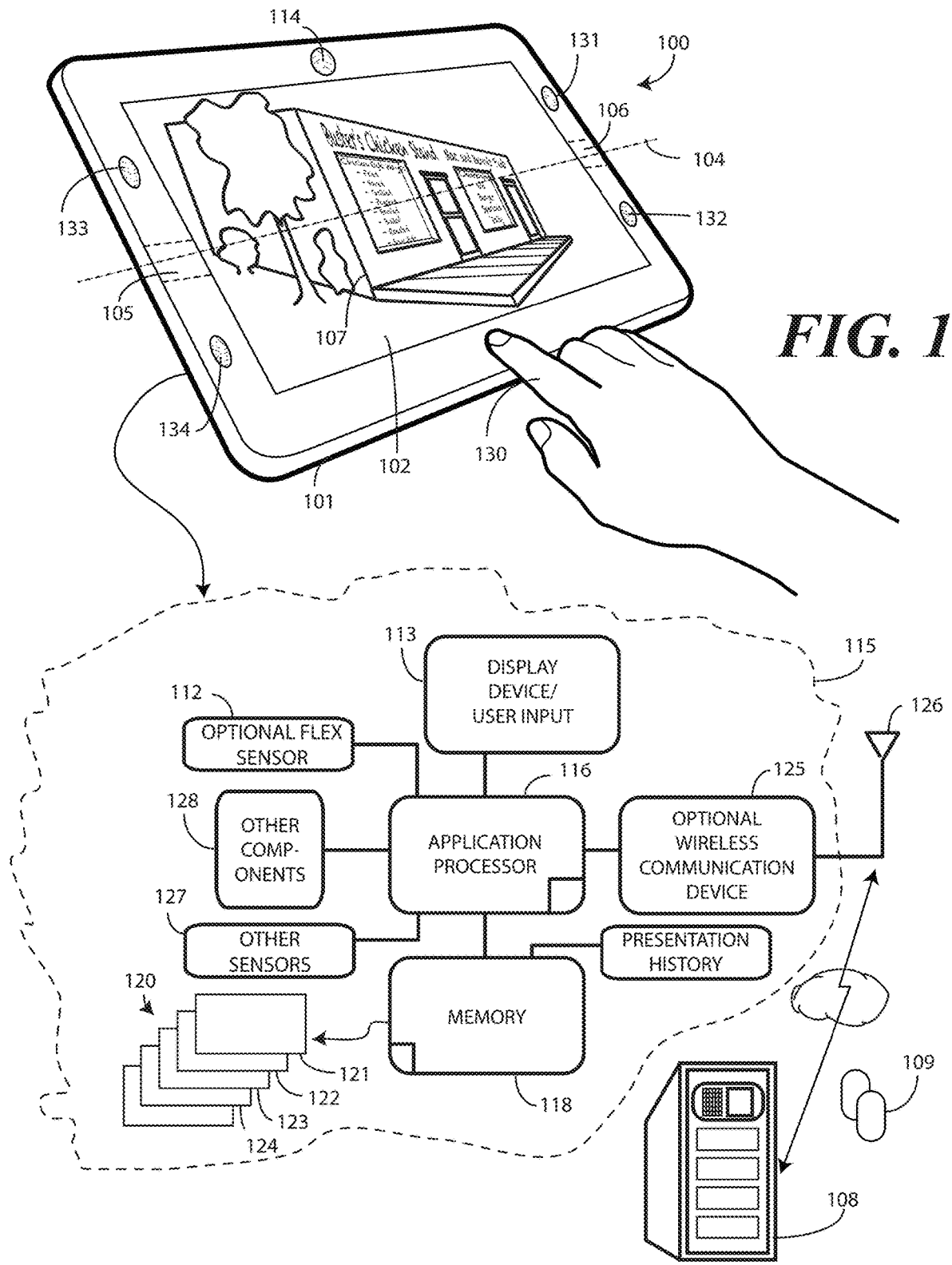
FIG. 1 illustrates a schematic block diagram of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in response to a bending operation occurring to deform a flexible display of the electronic device, remediating one or more portions of the flexible display to compensate performance degradation of the flexible display resulting from the presenting content on the other portions of the flexible display. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of remediating portions of a flexible display to compensate performance degradation as described herein. The non-processor circuits may include, but are not limited to, imaging devices, microphones, loudspeakers, acoustic amplifiers, digital to analog converters, signal drivers, clock circuits, power source circuits, and user input devices. As such, these functions may be interpreted as steps of a method to perform remediation functions when a flexible display is deformed by one or more bends and content is presented only on portions of the display.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device having a flexible display, improve the functioning of the electronic device itself by remediating portions of a flexible display to combat performance degradation resulting from the presenting content only on some portions of the flexible display to overcome problems specifically arising in the realm of the technology associated with flexible electronic devices having flexible displays.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure employ a system that includes an electronic device with a flexible display that can be physically deformed by one or more bends or folds. The flexible display is supported by a device housing.

In one embodiment, the housing of the electronic device is deformable. Internal and external components can be flexible as well. For instance, flexible batteries and flexible circuit boards can support various components within the electronic device. Touch sensors and substrates can be flexible as well. Remaining or other components disposed within the electronic device, such as one or more processors, other sensors, and other devices, are arranged such that a user can flex, bend, roll, and/or fold the electronic device by executing a bending operation that physically deforms one or more of the housing or display into a deformed geometry.

In another embodiment, the housing may include rigid components that are linked together by one or more hinges. Such hinges can provide a solution offering needed system flexibility by providing support and movement for the flexible display during bending operations. A multi-link hinge with support beams disposed beneath the flexible display, for example, can support the flexible display while allowing portions of the housing to pivot about an axis of the hinge.

In one or more embodiments, when the flexible display is deformed by one or more bends at a deformation portion, one or more processors operable with the flexible display are configured to reconfigure a presentation of content along only a portion of the flexible display, rather than its entirety. For example, when a user folds an electronic device in half and holds the folded device in their hand, half of the flexible display will be directed toward the user's palm. Accordingly, when in the folded configuration, one or more processors operable with the flexible display may not present content on portions directed toward the user's palm, and will instead present content on portions directed toward the user's eyes.

However, embodiments of the disclosure contemplate that flexible displays, especially Organic Light Emitting Diode (OLED) displays, can suffer from performance degradation when some portions of the display are used more than others. Illustrating by example, if content is continuously presented on one half of the flexible display and not the other, the brightness of the half presenting the content can diminish across time due to an issue referred to as display "burn-in." Additionally, embodiments of the disclosure contemplate that different color light emitting diodes can degrade in different ways across time with use. For instance, blue pixel brightness can diminish faster than red or green pixel brightness due to the physical construction of the diodes defining each pixel.

Accordingly, embodiments of the disclosure contemplate that, if content is continuously presented on one half of the flexible display and not the other, the half upon which the content is presented will grow to be "dimmer" in appearance than the half not presenting the content. Moreover, the half presenting the content can take on a more "yellowish" hue due to the more rapid degradation of blue pixels. Consequently, when a user unfolds the electronic device to use the entire flexible display presentation area, half of the flexible display will be brighter and clearer than the other. Additionally, one portion of the display may be presenting different colors to a user's eyes than another portion of the display. For example, one portion may look yellow in comparison to another portion. It should be noted that in some instances, burn-in will not be uniform. For example, applications that include continuously displayed graphics, such as notification bars, home icons, and the like, may suffer from burn-in by different amounts relative to other areas within the same portion of the display.

Advantageously, to combat this performance degradation, embodiments of the disclosure employ methods and systems that compensate for presentations of content on portions of a flexible display so that all portions of the flexible display achieve a similar ON time, and optionally similar graphical elements, so that any performance degradation of the display is distributed equally across all portions of the display. This is true even when the burn-in is non-uniform, as embodiments can remediate only portions of a flexible suffering from non-uniform burn-in such as along portions where notification bars, home icons, and the like are displayed.

Illustrating by example, in one embodiment one or more processors can monitor portions of a flexible display to record presentation parameters such as screen ON time, display brightness, content information such as an ON pixel value, or the values for the red, green, and blue pixels when ON. As a function of these presentation parameters, which can be stored in a presentation history, in one embodiment the one or more processors can model a compensation presentation to be presented on portions of the flexible display not presenting content to a user. In other embodiments, the one or more processors can request that the user turn the electronic device over so that display portion usage is equalized. Other methods of remediating the display will be described below. Still others will be obvious to those of ordinary skill in the art having the benefit of this disclosure.

Embodiments of the disclosure contemplate that the amount of burn-in that a portion of a flexible display experiences can be a function of a particular application operating on the electronic device. Said differently, some applications will cause content to be presented that burns in one or more portions of a flexible display more than that which occurs when a different application is causing the presentation of content. For example, an email application that presents text on a display that has a mostly white background, this will cause more burn-in that would, say, a gaming application or music application that presents information on a randomly colored background. Accordingly, in one or more embodiments one or more processors monitor application parameters in addition to presentation parameters to remediate performance degradation of a flexible display.

The presentation parameters can also be used when burn-in is not uniform. Illustrating by example, some applications cause particular content such as navigation menus, navigation bars, user actuation icons, and so forth to be continuously displayed. Where this occurs, portions of the flexible display are susceptible to non-uniform burn-in. However, by using application information and presentation parameters, embodiments of the disclosure can compensate for this non-uniform burn-in by remediating the display along portions where these continuously presented components are normally displayed. This can be done, in one embodiment, when the portion of the flexible display suffering from non-uniform burn-in is facing away from the user. After remediation, the portion will have a uniform appearance to the user's eye.

In one or more embodiments, the one or more processors operable with the flexible display further initiate automatic brightness and/or color compensation to remediate the flexible display in response to performance degradation. Illustrating by example, during remediation red pixels and green pixels can be exercised more than blue pixels to prevent portions of the display from appearing yellowish.

Embodiments of the disclosure contemplate that in OLED displays, some amount of burn-in is inevitable. However, when it occurs, the flexible display can be remediated such that all portions of the flexible display function at a substantially similar quality level so that some portions do not look dimmer or more yellow than others. This occurs, in one embodiment, when one or more processors use the presentation parameters to compensate less used portions of the flexible display by individually tuning color and/or brightness of the less used portions so that all portions of the flexible display achieve a substantially equivalent visual appearance when the flexible display is used in an undeformed configuration.

Turning now to FIG. 1, illustrated therein is one explanatory electronic device 100 configured in accordance with one or more embodiments of the disclosure. The electronic device 100 of FIG. 1 is a portable electronic device, and is shown operating as a tablet computer. This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display.

In one embodiment, when operating as a tablet computer, the display 102 has a diagonal dimension of between about seven and ten inches, inclusive. In one illustrative embodiment, the display has a diagonal dimension of about nine inches. Such a diagonal dimension is advantageous in that it allows the electronic device 100 to operate as a tablet computer when undeformed, and as a smartphone that fits comfortably in a user's hand when deformed by a central bend at a deformation portion. However, other diagonal dimensions will be obvious to those of ordinary skill in the art having the benefit of this disclosure.

In one embodiment, the display 102 is configured as an OLED display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 102 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate any of bends, rolls and folds, alone or in combination. In one or more embodiments the display 102 may be formed from multiple layers of flexible material such as flexible sheets of polymer or other materials.

The explanatory electronic device 100 of FIG. 1 also includes a housing 101 supporting the display 102. In one or more embodiments, the housing 101 is flexible. In one embodiment, the housing 101 may be manufactured from a malleable, bendable, or physically deformable material such as a flexible thermoplastic, flexible composite material, flexible fiber material, flexible metal, organic or inorganic textile or polymer material, or other materials. In other embodiments, the housing 101 could also be a combination of rigid segments connected by hinges 105,106 or flexible materials. Still other constructs will be obvious to those of ordinary skill in the art having the benefit of this disclosure.

Where the housing 101 is a deformable housing, it can be manufactured from a single flexible housing member or from multiple flexible housing members. In this illustrative embodiment, the housing 101 is designed to be symmetrical along a centerline 104 bisecting the device. For example, a user interface component 114, which may be a button or touch sensitive surface, is disposed along the housing 101 in this embodiment at two locations that are symmetrical about the centerline 104 (note that a second user interface component is disposed beneath the user's finger 130 in this illustration, but is shown below in FIG. 4). The user interface components 114 can facilitate control of the electronic device 100. Other features can be added, and can be located on the front of the housing 101, sides of the housing 101, or the rear of the housing 101. For instance, in this embodiment two audio output devices 131,132 and two audio input devices 133,134 are disposed along the housing 101 in symmetrical configurations about the centerline 104 so that the user will have access to at least one audio input device, audio output device, and user interface component when the electronic device 100 is folded along the centerline 104. Thus, in one illustrative embodiment the electronic device 100 is configured to be identical in appearance and function along each side of the device when folded along a reference line, such as centerline 104. Other configurations will be obvious to those of ordinary skill in the art having the benefit of this disclosure.

A block diagram schematic 115 of the electronic device 100 is also shown in FIG. 1. In one embodiment, the electronic device 100 includes one or more processors. In one or more embodiments, the one or more processors include an application processor 116. The application processor 116 can include one or more processors. The application processor 116 can be a microprocessor, a group of processing components, one or more Application Specific Integrated Circuits (ASICs), programmable logic, or other type of processing device. The application processor 116 can be operable with the various components of the electronic device 100. The application processor 116 can be configured to process and execute executable software code to perform the various functions of the electronic device 100. A storage device, such as memory 118, can optionally store the executable software code used by the application processor 116 during operation.

As will be described in more detail below, in one or more embodiments when the electronic device 100 is deformed by a bend at a deflection portion, the one or more processors divide a portion of the display 102 into a first subportion that is disposed to one side of the deflection, and a second subportion that is complementary to the first subportion. The first subportion and the second subportion can include area within a deformation portion, even it such portions are not actively presenting information. The application processor 116 can then present content in the first subportion.

In one embodiment, the application processor 116 is responsible for performing the primary functions of the electronic device 100. For example, in one embodiment the application processor 116 comprises one or more circuits operable to present presentation information, such as images, text, and video, on the display 102, or portions thereof. The executable software code used by the application processor 116 can be configured as one or more modules 120 that are operable with the application processor 116. Such modules 120 can store instructions, control algorithms, and so forth.

In one embodiment, the application processor 116 is responsible for running the operating system environment 121. The operating system environment 121 can include a kernel, one or more drivers 122, and an application service layer 123, and an application layer 124. The operating system environment 121 can be configured as executable code operating on one or more processors or control circuits of the electronic device 100.

In one or more embodiments, the application processor 116 is responsible for managing the applications of the electronic device 100. In one or more embodiments, the application processor 116 is also responsible for launching, monitoring and killing the various applications and the various application service modules. The applications of the application layer 124 can be configured as clients of the application service layer 123 to communicate with services through application program interfaces (APIs), messages, events, or other inter-process communication interfaces.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

As shown in FIG. 1, the application processor 116 is presenting content 107 on the display 102 at a predefined aspect ratio. The content 107 of this illustration is a graphical image. In one or more embodiments, content 107 is retrieved, using the communication circuit 125, from one or more remote servers 108. In one or more embodiments, this content 107 is retrieved in the form of "app packages" 109.

Figure 4:
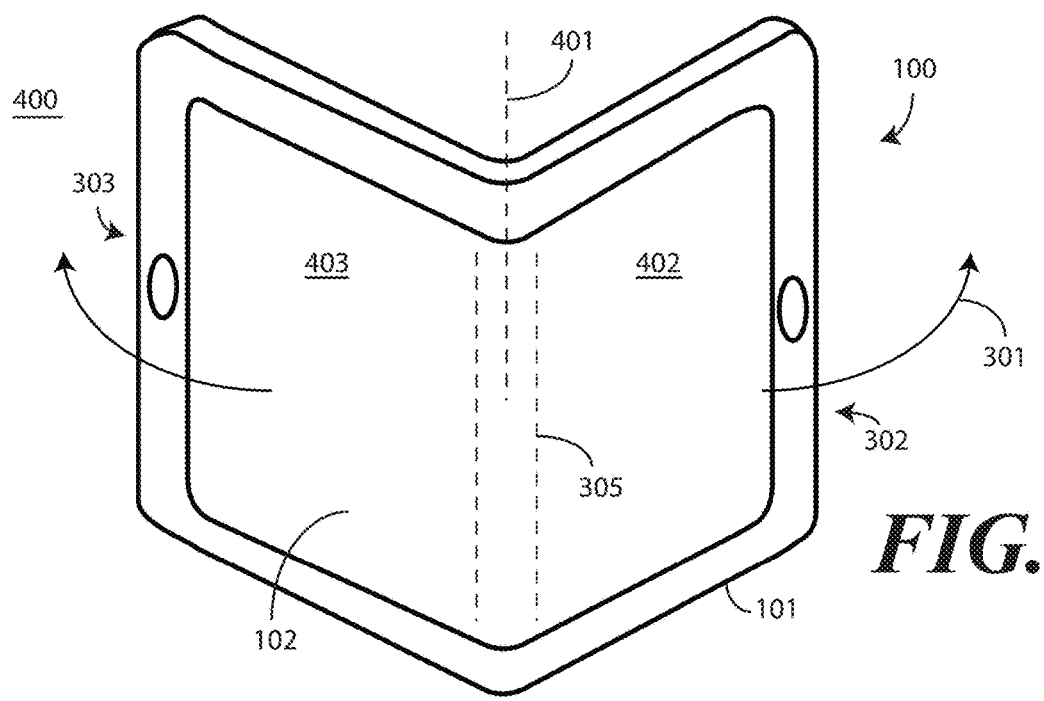
FIG. 4 illustrates one explanatory electronic device having a flexible display that is deformed by one or more bends in accordance with one or more embodiments of the disclosure.
Figure 5:
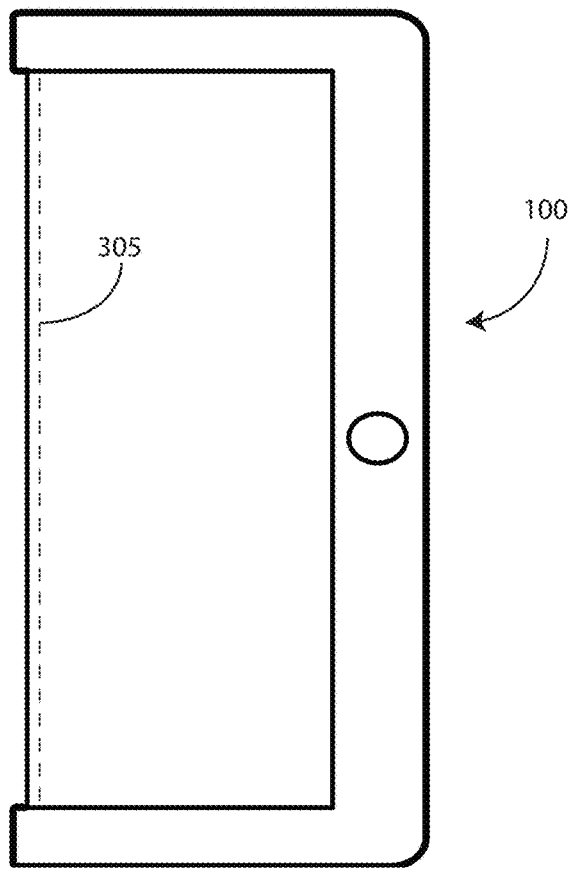
FIG. 5 illustrates one explanatory electronic device in a deformed physical configuration in accordance with one or more embodiments of the disclosure.
Figure 6:
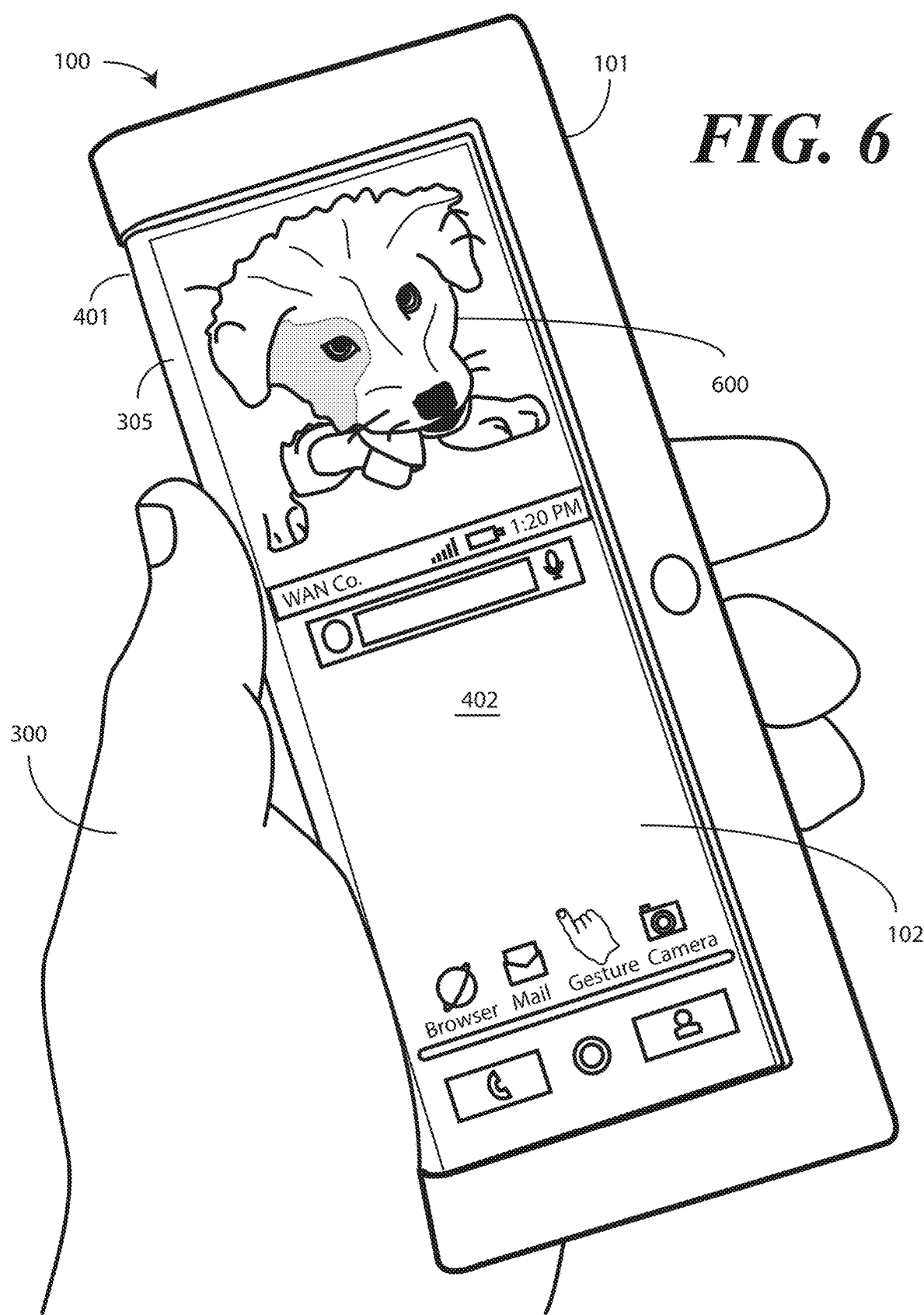
FIG. 6 illustrates one explanatory electronic device in a deformed physical configuration with one or more processors dividing a flexible display and presenting content in a first portion of the flexible display in accordance with one or more embodiments of the disclosure.

In one embodiment, the electronic device 100 includes one or more flex sensors 112, supported by the housing 101 and operable with the application processor 116, to detect a bending operation deforming one or more of the housing 101 or the display 102 into a deformed geometry, such as that shown in FIGS. 4-6. The inclusion of flex sensors 112 is optional, and in some embodiment flex sensors 112 will not be included. As one or more functions of the electronic device 100 occur when the display 102 is deformed by one or more bends, where flex sensors 112 are not included, the user can alert the application processor 116 to the fact that the one or more bends are present through the user interface 113 or by other techniques.

In one embodiment, the flex sensors 112 each comprise passive resistive devices manufactured from a material with an impedance that changes when the material is bent, deformed, or flexed. By detecting changes in the impedance as a function of resistance, the application processor 116 can use the one or more flex sensors 112 to detect bending or flexing. In one or more embodiments, each flex sensor 112 comprises a bi-directional flex sensor that can detect flexing or bending in two directions. In one embodiment, the one or more flex sensors 112 have an impedance that increases in an amount that is proportional with the amount it is deformed or bent.

In one embodiment, each flex sensor 112 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 112 bends, the impedance of the resistive layer changes, thereby altering the flow of current for a given voltage. The application processor 116 can detect this change to determine an amount of bending. Taps can be added along each flex sensor 112 to determine other information, including the number of folds, the degree of each fold, the location of the folds, the direction of the folds, and so forth.

The flex sensor 112 can further be driven by time-varying signals to increase the amount of information obtained from the flex sensor 112 as well. While a multi-layered device as a flex sensor 112 is one configuration suitable for detecting a bending operation occurring to deform the electronic device 100 and a geometry of the electronic device 100 after the bending operation, others can be used as well. For example, in another embodiment the proximity sensors can be used to detect how far a first end of the electronic device 100 is from a second end of the electronic device 100. Still other types of flex sensors 112 will be obvious to those of ordinary skill in the art having the benefit of this disclosure.

In one embodiment, the application processor 116 may generate commands or execute control operations based on information received from the various sensors, including the one or more flex sensors 112, the user interface 113, or the other sensors 127. The application processor 116 may also generate commands or execute control operations based upon information received from a combination of the one or more flex sensors 112, the user interface 113, or the other sensors 127. Alternatively, the application processor 116 can generate commands or execute control operations based upon information received from the one or more flex sensors 112 or the user interface 113 alone. Moreover, the application processor 116 may process the received information alone or in combination with other data, such as the information stored in the memory 118.

The other sensors 127 may include a microphone, an earpiece speaker, a loudspeaker, key selection sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the housing 101 can be used to determine whether the electronic device 100 is being touched at side edges or major faces of the electronic device 100 are being performed by a user. The touch sensors can include surface and/or housing capacitive sensors in one embodiment. The other sensors 127 can also include video sensors (such as a camera).

The other sensors 127 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion. In one embodiment the motion detectors are also operable to detect movement, and direction of movement, of the electronic device 100 by a user.

Other components 128 operable with the application processor 116 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
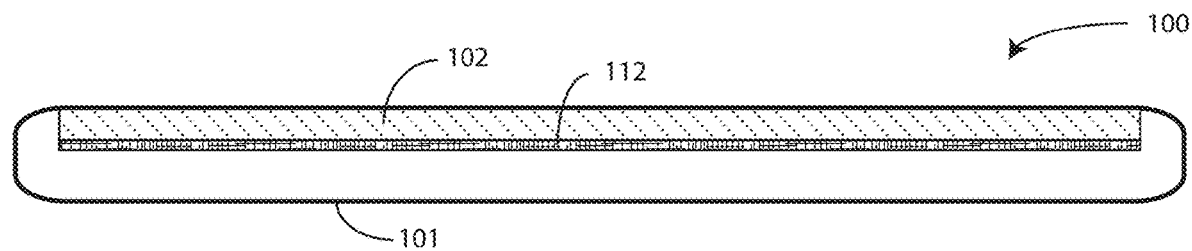
FIG. 2 illustrates a sectional view of one explanatory electronic device in accordance with one or more embodiments of the disclosure, with the electronic device in an undeformed physical configuration.

Now that the various hardware components have been described, attention will be turned to methods, systems, and use cases in accordance with one or more embodiments of the disclosure. Beginning with FIG. 2, illustrated therein is a sectional view of the electronic device 100. Shown with the electronic device 100 are the display 102 and the housing 101, each of which is flexible in this embodiment. Also shown is the flex sensor 112, which spans at least two axes in one embodiment (along the width of the page and into the page as viewed in FIG. 2) of the electronic device 100.

Figure 3:
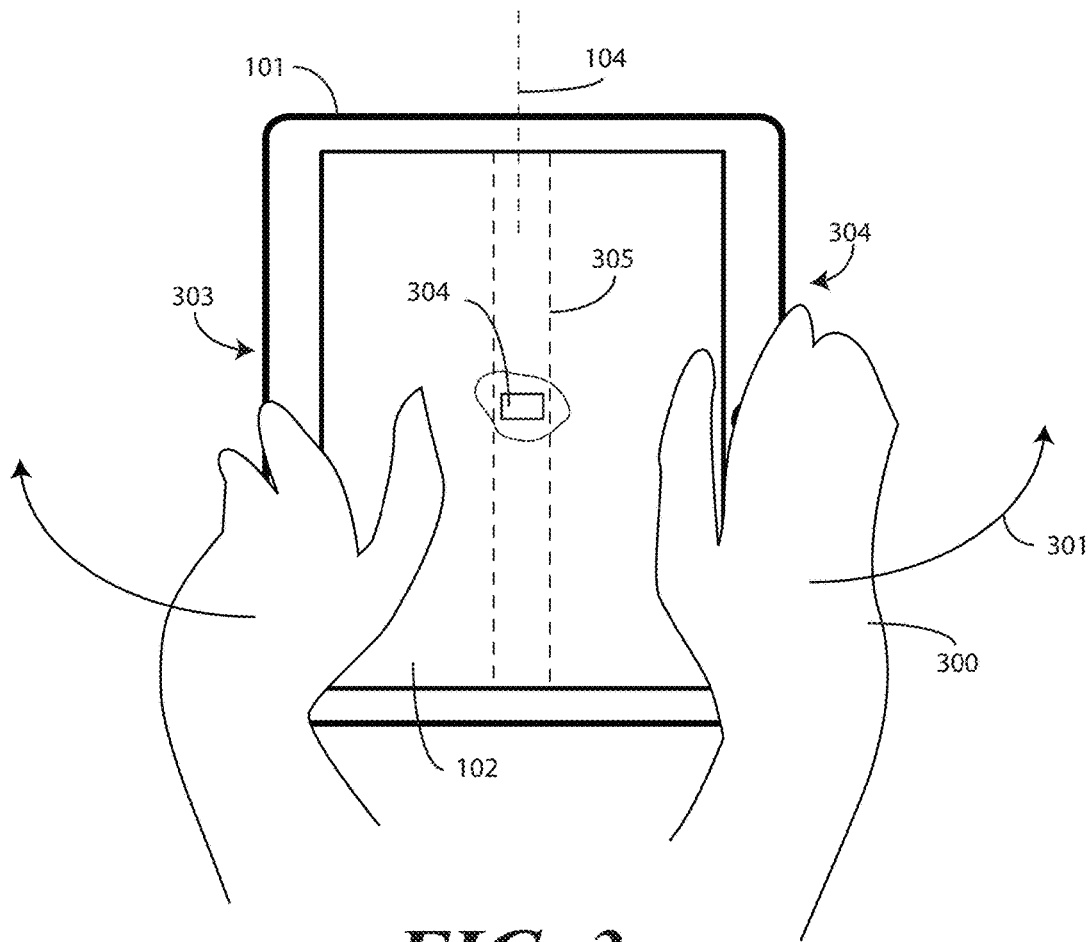
FIG. 3 illustrates a user manipulating one explanatory electronic device in accordance with one or more embodiments of the disclosure to execute a bending operation to deform the electronic device.

Turning now to FIG. 3, a user 300 is executing a bending operation 301 upon the electronic device 100 to impart deformation at a deformation portion 305 of the electronic device 100. In one embodiment, the deformation portion 305 is disposed about the centerline 104. In this illustration, the user 300 is applying force (into the page) at the first side 302 and a second side 303 of the electronic device 100 to bend both the housing 101, which is deformable in this embodiment, and the display 102 at the deformation portion 305. Internal components disposed along flexible substrates are allowed to bend as well along the deformation portion 305. This method of deforming the housing 101 and display 102 allows the user 300 to simply and quickly bend the electronic device 100 into a desired deformed physical configuration or shape.

In other embodiments, rather than relying upon the manual application of force, the electronic device can include a mechanical actuator 304, operable with the application processor (116), to deform the display 102 by one or more bends. For example, a motor or other mechanical actuator can be operable with structural components to bend the electronic device 100 to predetermined angles and physical configurations in one or more embodiments. The use of a mechanical actuator 404 allows a precise bend angle or predefined deformed physical configurations to be repeatedly achieved without the user 300 having to make adjustments. However, in other embodiments the mechanical actuator 304 will be omitted to reduce component cost.

Regardless of whether the bending operation 301 is a manual one or is instead one performed by a mechanical actuator 304, it results in the display 102 being deformed by one or more bends. One result 400 of the bending operation 301 is shown in FIG. 4. In this illustrative embodiment, the electronic device 100 is deformed by a single bend 401 at the deformation portion 305. However, in other embodiments, the one or more bends can comprise a plurality of bends. Other deformed configurations will be obvious to those of ordinary skill in the art having the benefit of this disclosure.

In one embodiment, the application processor (116) of the electronic device 100 is operable to detect that a bending operation 301 is occurring by detecting a change in an impedance of the one or more flex sensors (112). The application processor (116) can detect this bending operation 301 in other ways as well. For example, the touch sensors can detect touch and pressure from the user. Alternatively, the proximity sensors can detect the first side 302 and the second side 303 of the electronic device 100 getting closer together. Force sensors can detect an amount of force that the user is applying to the housing 101 as well. The user (300) can input information indicating that the electronic device 100 has been bent using the display 102 or other user interface (113). Other techniques for detecting that the bending operation 301 has occurred will be obvious to those of ordinary skill in the art having the benefit of this disclosure.

In one or more embodiments, the application processor (116) is operable to detect the number of bends or folds in the electronic device 100 resulting from the bending operation 301. In one embodiment, after determining the number of bends or folds, the application processor (116) can partition the display 102 of the electronic device 100 as another function of the one or more bends or folds. Since there is a single bend 401 here, in this embodiment the display 102 has been partitioned into a first portion 402 and a second portion 403, with each portion being disposed on opposite sides of the single bend 401.

In one or more embodiments, the bending operation 301 can continue from the physical configuration of FIG. 4 until the electronic device 100 is fully folded as shown in FIG. 5. Embodiments of the disclosure contemplate that a user (300) may hold the electronic device 100 in one hand when in this deformed physical configuration. For example, the user (300) may use the electronic device 100 as a smartphone in the folded configuration of FIG. 5, while using the electronic device 100 as a tablet computer in the unfolded configuration of FIG. 3. Accordingly, in one embodiment, the application processor (116) presents content only to one side of the deformation portion 305, at least when not operating in remediating modes, in response to detecting the deformation. In this illustrative embodiment, the one side is to the right of the deformation portion 305. However, if the electronic device 100 were flipped over, as detected by the accelerometer, gyroscope, or other sensors (127), the one side would be to the left of the deformation portion 305.

Turning now to FIG. 6, illustrated therein is the electronic device 100, in the folded configuration, being used by the user 300. The flexible display 102 has been deformed by a bend 401 along a deformation portion 305. One or more flex sensors (112) have detected this deflection of the flexible display 102. Optionally, the one or more flex sensors (112) additionally determine a location along the deformable housing 101 defining the deformation portion 305, which allows the application processor (116) to adjust the presentation of the content 600 as a function of the bend 401.

In this illustration, an application processor (116), operable with the one or more flex sensors (112), presents content 600 on portions, e.g., portion 402, of the flexible display 102 disposed to one side of the deflection defined by the bend 401. Here the content 600 comprises a smartphone home screen and a picture of the user's dog, Buster. Accordingly, the application processor (116) allows the user 300 to look at his dog, Buster, while using the electronic device 100 as a smartphone at the same time.

As noted above, embodiments of the disclosure contemplate that when the electronic device 100 is used for extended periods of time in the folded configuration of FIG. 6, with content 600 being presented only on some portions of the flexible display 102, e.g., only to one side of the bend 401, performance degradation can occur. This performance degradation can include burn-in along the portion 402 of the flexible display 102 presenting the content 600 in one or more embodiments. The performance degradation can include a general loss of brightness along the portion 402 of the flexible display 102 presenting the content 600. Additionally, the performance degradation can include a loss of blue pixel brightness compared with red pixel or green pixel brightness, which can cause a general yellowing along the portion 402 of the flexible display 102 presenting the content 600.

Figure 7:
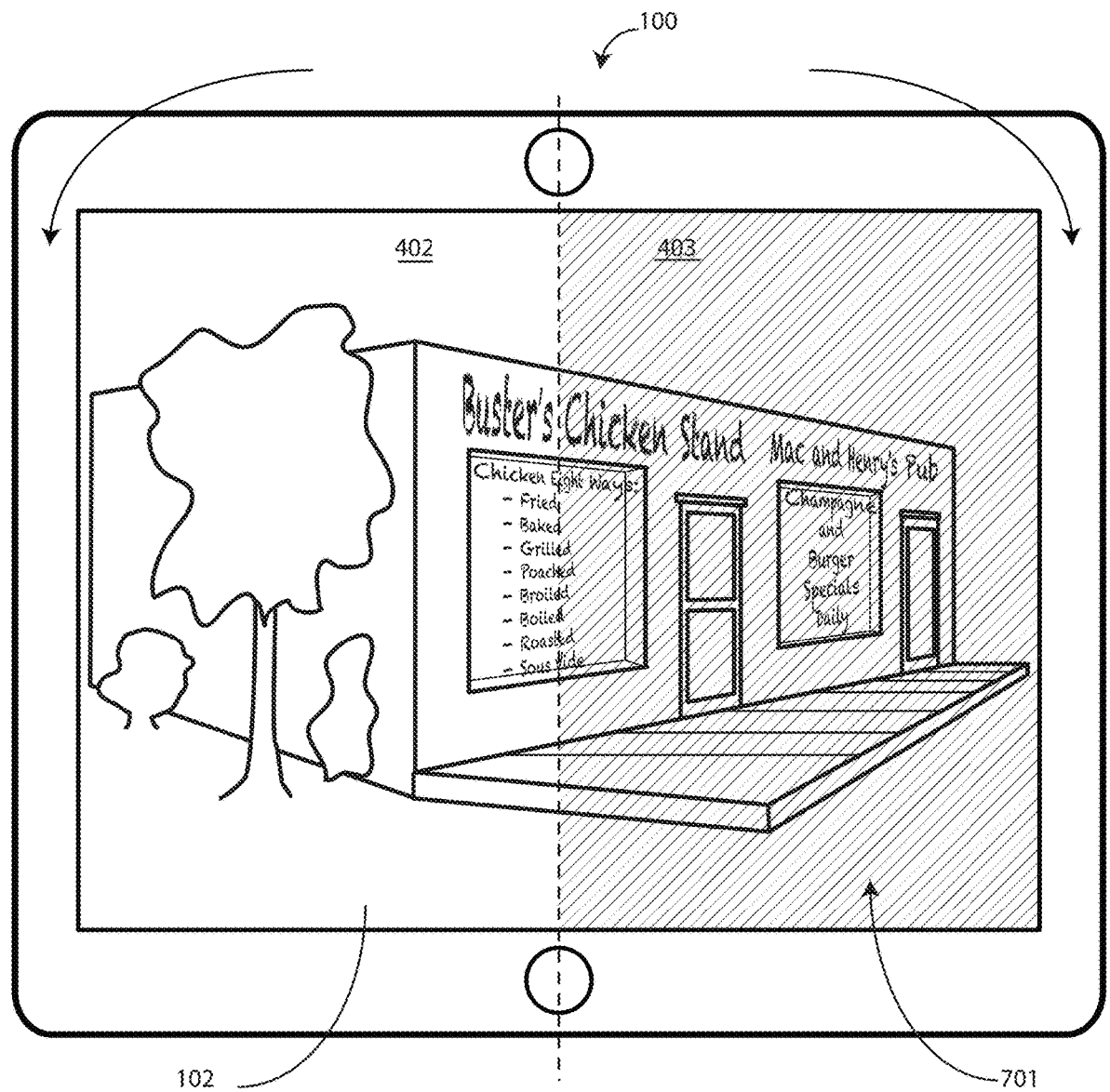
FIG. 7 illustrates one explanatory device in an undeformed configuration prior to remediation in accordance with one or more embodiments of the disclosure.

Turning now to FIG. 7, one example of this performance degradation 701 can be seen. As shown in FIG. 7, the electronic device 100 has been unfolded and transitioned to the extended, substantially planar physical configuration associated with the tablet computer mode. However, in response to extended operation in the folded mode of FIG. 6, performance degradation 701 resulting from the presentation of content (600) on the first portion 402 of the flexible display 102 and not the second portion 403. In one embodiment, the performance degradation 701 comprises one or more of a loss of brightness or a discoloration of the first portion 402 of the flexible display 102. In one embodiment, the performance degradation 701 is caused by non-uniform usage of the first portion 402 of the flexible display 102 relative to the second portion 403. In this illustrative example, the performance degradation causes the first portion 402 of the flexible display 102 to look dimmer and more yellowed than the second portion 403 of the flexible display 102.

Advantageously, embodiments of the disclosure are operable to remediate the second portion 403 of the flexible display 102 to compensate performance degradation 701 of the flexible display 102 resulting from the presentation of content (600) on the first portion 402 of the flexible display 102. It should be noted that "remediation" as this term is used in this disclosure does not mean reversing the performance degradation, as embodiments of the disclosure contemplate that performance degradation 701 is inevitable in many cases. Accordingly, as used herein, "remediation" refers to executing compensating methods and applying compensating systems to lesser used portions of the flexible display 102, such as by presenting content, tuning color, and/or brightness of the less used portions so that all portions of the flexible display 102 achieve a substantially equivalent visual appearance when the flexible display 102 is used in an undeformed configuration. Accordingly, a remediated display is not devoid of performance degradation, but instead ensures that any performance degradation that may occur happens substantially equally along all portions of the flexible display 102. One example of a remediated flexible display will be described in more detail below with reference to FIG. 16.

Figure 8:
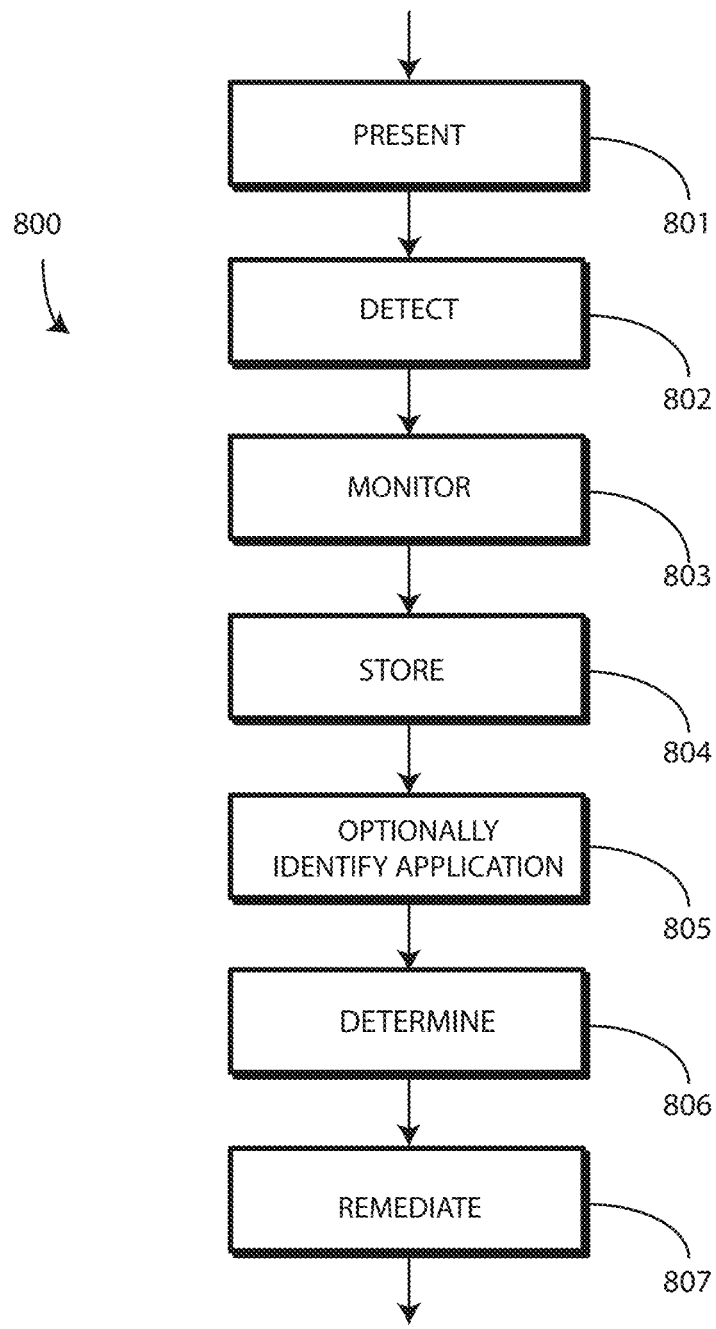
FIG. 8 illustrates one explanatory method in accordance with one or more embodiments of the disclosure.

Turning now to FIG. 8, illustrated therein is one explanatory method 800 for remediating performance degradation resulting from the presentation of content on only some portions of a flexible display of an electronic device. At step 801, the method 800 includes detecting, optionally with one or more flex sensors, deformation of the flexible display by a bend. In one embodiment, step 801 further comprises partitioning the flexible display into a first portion and a second portion, with the first portion disposed to one side of the bend and the second portion disposed to the other side of the bend.

At step 802, the method 800 includes presenting content on the first portion of a flexible display. In one embodiment, step 802 optionally includes causing the second portion to enter a low-power or sleep mode. Illustrating by example, in one embodiment step 802 includes further transitioning portions of the flexible display disposed to an opposite side of the bend to a low-power or sleep mode of operation.

At optional step 803, the method 800 includes monitoring a presentation characteristic of the content being presented at step 802. In one or more embodiments, these presentation characteristics are monitored to estimate the amount of performance degradation occurring while the first portion presents the content. As will be described in more detail below, in one or more embodiments remediation operations that occur in accordance with embodiments of the disclosure occur as a function of the presentation characteristics monitored at step 803.

In one embodiment, step 803 includes monitoring an ON time of the first portion of the display while the first portion is presenting content. In another embodiment, step 803 comprises monitoring a brightness of the first portion of the display while the first portion is presenting content. In still another embodiment, step 803 comprises monitoring an ON pixel value for pixels of the first portion of the display while the first portion of the display is presenting content. Of course, combinations of these presentation characteristics can be monitored at step 803 as well. Still other performance characteristics suitable for monitoring at step 803 will be obvious to those of ordinary skill in the art having the benefit of this disclosure.

In one or more embodiments, the presentation characteristics monitored at step 803 can be stored in a memory device to define a content presentation history at step 804. For example, in one embodiment, the content presentation history comprises a record of an ON time of the first portion, a brightness of the first portion, an ON pixel value of the first portion, or combinations thereof. Embodiments of the disclosure contemplate that in some applications content will be presented on the first portion of the flexible display, while in other applications content will be presented on the second portion of the flexible display. Accordingly, across time the storage occurring at step 804 can define a presentation history that includes a record of an ON time, a brightness, an ON pixel value, or combinations thereof, for the first portion and the second portion, respectively.

At optional step 805, in one embodiment the method 800 monitors a type of application causing the presentation of content on the first portion of the flexible display. As noted above, embodiments of the disclosure contemplate that the amount of burn-in that a portion of a flexible display experiences can be a function of a particular application operating to cause the presentation of content. For example, an email application that presents black text on an otherwise white display will cause more burn-in that would, say, a gaming application or music application that presents information on a black background. Accordingly, in one or more embodiments one or more processors monitor a record of a type of application causing the presentation of content and/or application parameters corresponding to the application at step 805. In one embodiment, this application recording can be stored to the presentation history at step 805 as well.

At step 806, the method 800 determines that a portion of the flexible display requires remediation to compensate for performance degradation resulting from the presentation of content to the one side of the bend, or to another side of the bend, in step 802. This determination can be made in a variety of ways. In one simple embodiment, a portion requires remediation when it has been used less than another portion. In another embodiment, the presentation history stored in memory can be used to determine when portions need remediation. In another embodiment, monitored presentation characteristics, including an ON time of various portions of the display, a brightness of various portions of the display, an ON pixel value of various portions of the display, or combinations thereof, can be used to determine that a portion of the flexible display requires remediation to compensate for performance degradation resulting from the presentation of content to the one side of the bend, or to another side of the bend. Still other techniques for making the determination of step 806 will be obvious to those of ordinary skill in the art having the benefit of this disclosure.

At step 807, the method 800 remediates the display. In one embodiment, the method 800 of FIG. 8 includes presenting, at step 802, content on one portion of the flexible display disposed to the one side of a bend, and remediating, at step 807, another portion of the flexible display to the another side of the bend. In one or more embodiments, the presenting of step 801 and the remediating of step 807 occur simultaneously. In other embodiments, they occur at different times. Examples of how this can occur will be explained in more detail below with reference to FIGS. 9-12. Still other methods of remediating the display will be obvious to those of ordinary skill in the art having the benefit of this disclosure.

Figure 9:
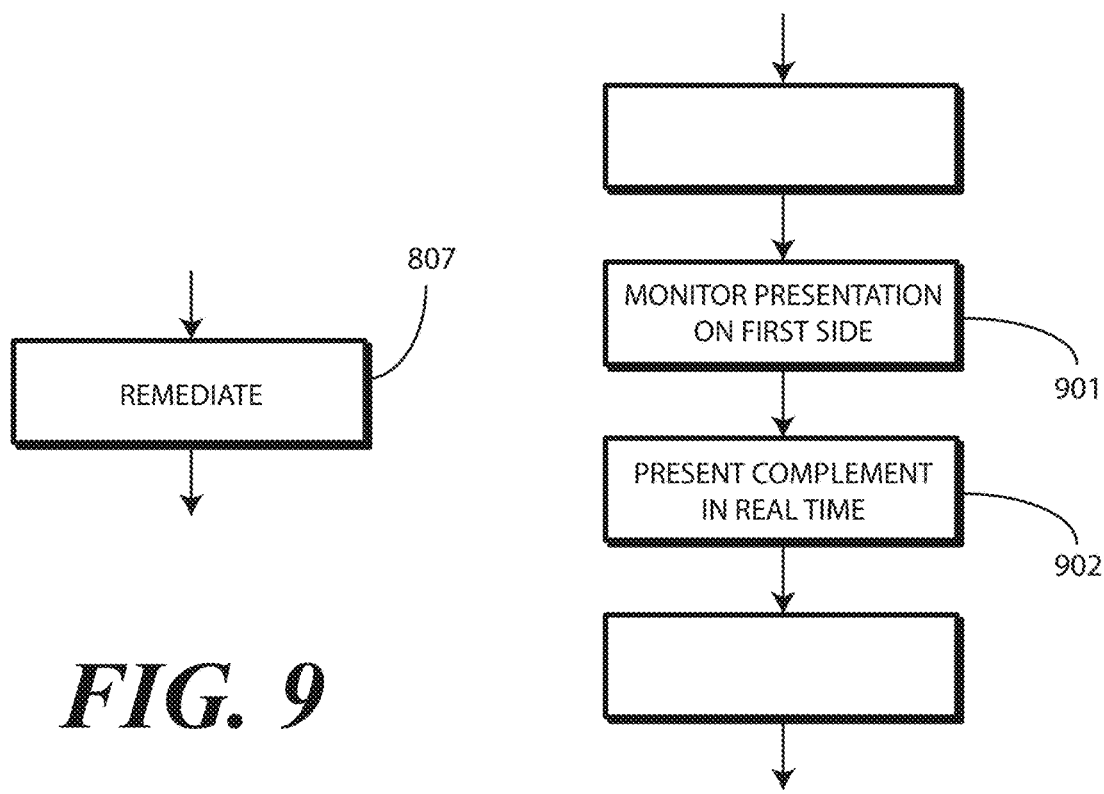
FIG. 9 illustrates one or more method steps, suitable for inclusion with an illustrative method in accordance with one or more embodiments of the disclosure.

Beginning with FIG. 9, in one embodiment the remediating occurring at step 807 comprises monitoring, at step 901, the content being presented on the first portion of the display and presenting, at step 902, other content that is complementary to the content on the second portion of the display. For example, in one embodiment a mirror image of the content being presented on the first portion of the display can be presented on the second portion of the display. In another embodiment, the exact same content that is being presented on the first portion of the display can be presented on the second portion of the display. In one or more embodiments, the presenting of content on the first portion of the display (step 802 of FIG. 8), and the remediating occurring at step 807 by presenting complementary content on the second portion of the display at step 902, occurs concurrently.

Figure 10:
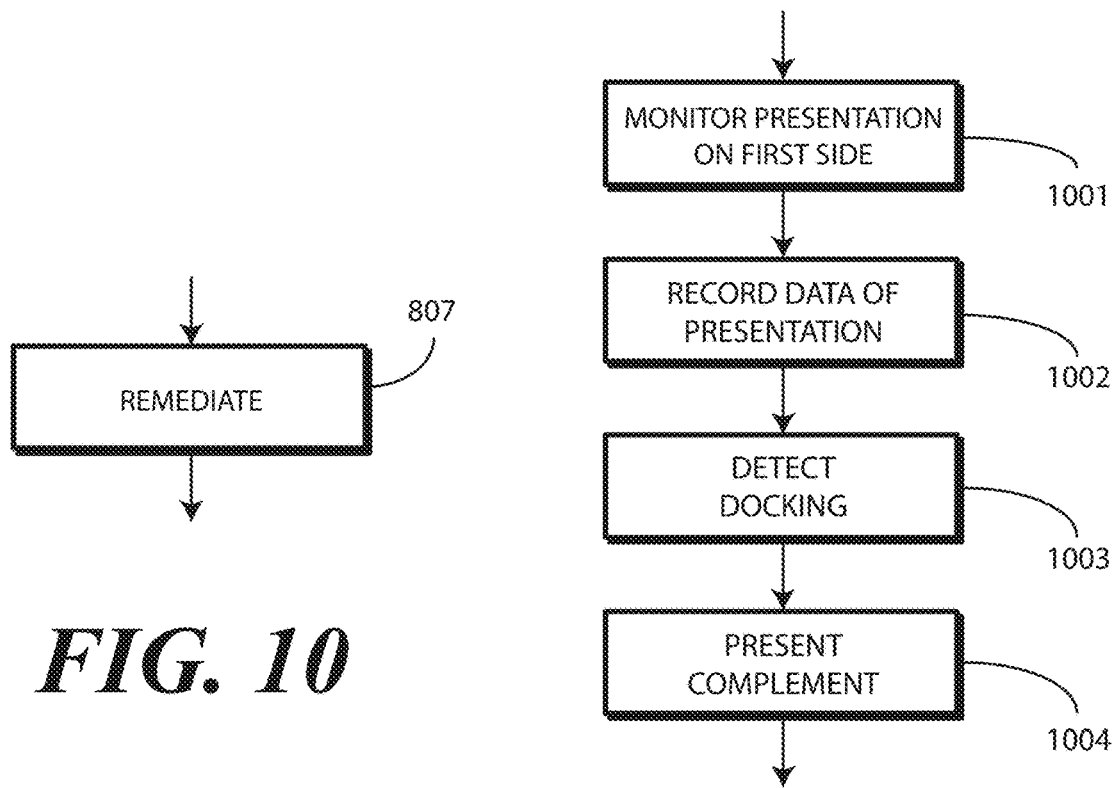
FIG. 10 illustrates one or more method steps, suitable for inclusion with an illustrative method in accordance with one or more embodiments of the disclosure.

Turning now to FIG. 10, illustrated therein is another example of how the remediating of step 807 can occur. Embodiments of the disclosure contemplate that it can be beneficial to perform the remediation only at select, opportune times. For example, where a user is not actively using an electronic device, remediation activities might occur. By contrast, when the user is actively using the electronic device, remediation may be precluded so as not to disrupt the user's usage of the electronic device.

Accordingly, at step 1001 the remediating occurring at step 807 comprises monitoring the content being presented on the first portion of the display. At step 1002, presentation characteristics corresponding to the presentation are recorded in memory. These presentation characteristics can include an ON time of the first portion of the display, a brightness of the first portion of the display, an ON pixel value for pixels of the first portion of the display, or other characteristics. In one embodiment, these characteristics are stored in a memory device to define a content presentation history as described above.

At step 1003, a docking operation is detected. Examples of docking operations include coupling the electronic device to a charger or power supply, coupling the electronic device to a docking station, causing the electronic device to enter a docked mode of operation such as presenting a clock for nightstand use, or bending the electronic device into one or more predefined geometrical configurations corresponding to a docked mode. Embodiments of the disclosure contemplate that a user is unlikely to be using the electronic device when in the docket mode.

At step 1004, other content that is complementary to the content monitored at step 1001 on the second portion of the display. In one embodiment, this other content is presented on the display while the electronic device is in the docked mode of operation. The complementary content can be identical to the content monitored at step 1001 in one embodiment. In other embodiments, the complementary content can be different content created as a function of the monitored presentation characteristics that causes the second portion pixels to emit brightness, color, and intensities of light so as to operate in a complementary fashion to the way the first portion operated while being monitored at step 1001. For instance, a series of flashes, patterns, or other abstract content presentations can exercise the pixels so that each pixel gets the same amount of ON time, brightness, and/or pixel value that the first portion did when presenting the content monitored at step 1001.

For example, in one embodiment a mirror image of the content being presented on the first portion of the display can be presented on the second portion of the display. In another embodiment, the exact same content that is being presented on the first portion of the display can be presented on the second portion of the display. In one or more embodiments, the presenting of content on the first portion of the display (step 802 of FIG. 8), and the remediating occurring at step 807 by presenting complementary content on the second portion of the display at step 902, occurs concurrently.

Figure 11:
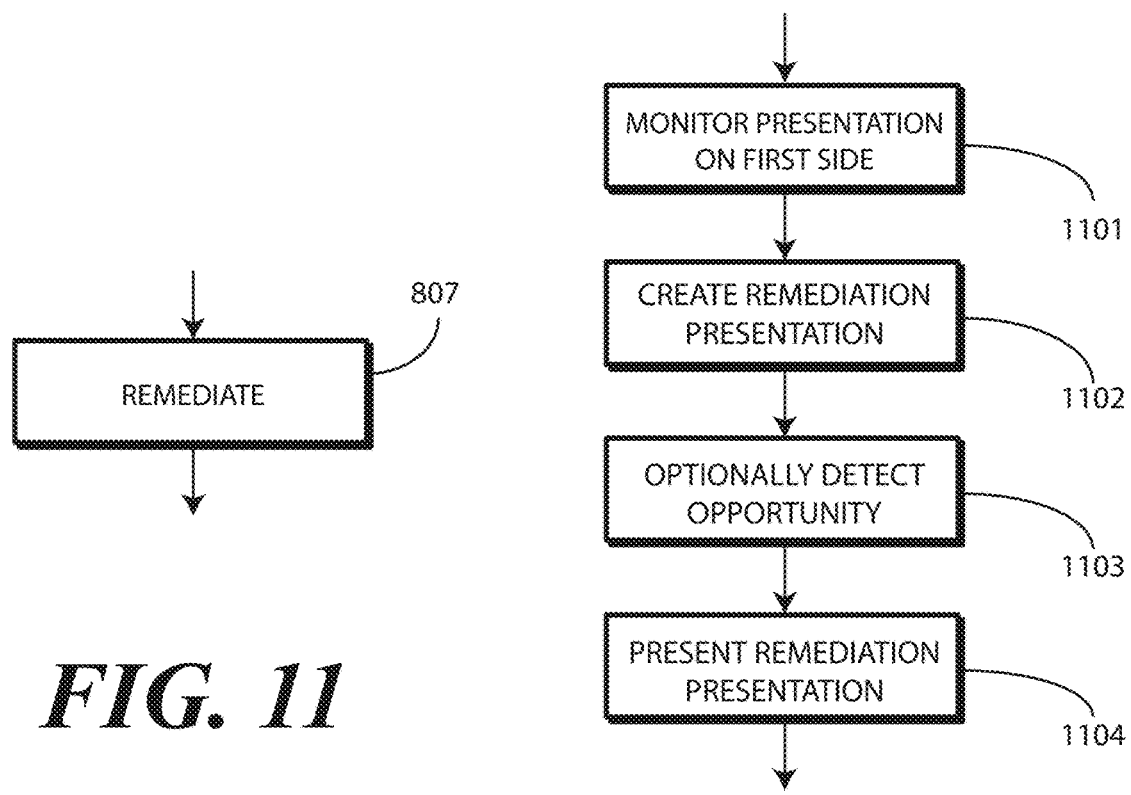
FIG. 11 illustrates one or more method steps, suitable for inclusion with an illustrative method in accordance with one or more embodiments of the disclosure.

Turning now to FIG. 11, illustrated therein is another example of how the remediating of step 807 can occur. At step 1101 the remediating occurring at step 807 comprises monitoring the content being presented on the first portion of the display. At step 1002, content complementary to the content monitored at step 1101 is created. In one embodiment, the different content is created created as a function of the monitored presentation characteristics that causes the second portion pixels to emit brightness, color, and intensities of light so as to operate in a complementary fashion to the way the first portion operated while being monitored at step 1101. As noted above, a series of flashes, patterns, or other abstract content presentations can exercise the pixels so that each pixel gets the same amount of ON time, brightness, and/or pixel value that the first portion did when presenting the content monitored at step 1101.

At step 1103, an opportune moment to perform the remediation is identified. As noted above, embodiments of the disclosure contemplate that it can be beneficial to perform the remediation only at select, opportune times. Examples of such opportune times include times where the electronic device is not moving, as detected by the motion detectors, or is in a low-power or sleep mode. Once such an opportune time is detected, remediation can occur at step 1104 as previously described.

Figure 12:
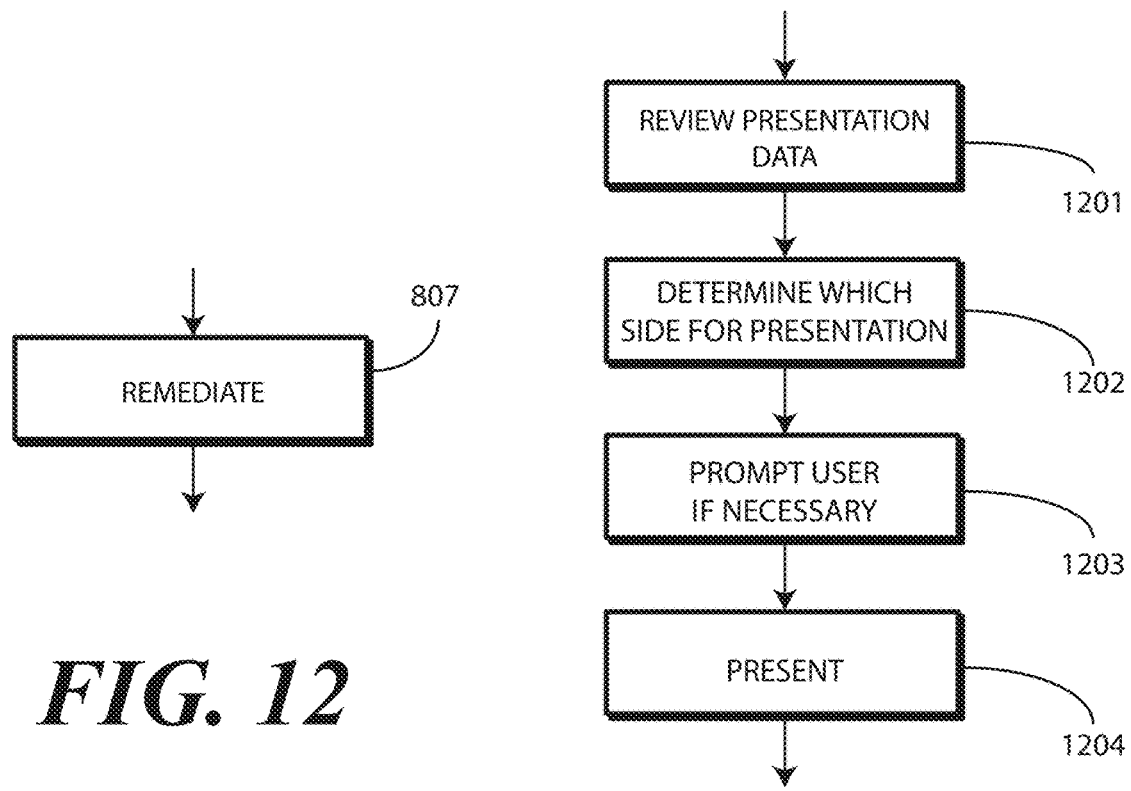
FIG. 12 illustrates one or more method steps, suitable for inclusion with an illustrative method in accordance with one or more embodiments of the disclosure.

Turning now to FIG. 12, illustrated therein is yet another alternate method of how the remediation of step 807 can occur. In contrast to the methods of FIGS. 9-11, rather than remediating a lesser-used portion of the display, a user is prompted to actively use a lesser portion of the display. Accordingly, rather than presenting complementary content, only primary content is presented on portions of the display. However, the user is prompted to flip the electronic device over periodically so that complementary portions of the display are used roughly in equal amounts.

Beginning with step 1201, when the presentation of content on a portion of a display is desired, a presentation history of the device is reviewed. As noted above, the presentation history can include a record of an ON time of various portions of the display, a brightness of various portions of the display, an ON pixel value of various portions of the display, applications that were operable to cause the presentation of content on the display, or combinations thereof.

At step 1202, a selection is made selecting one of a first portion or a second portion on which to present content to remediate the first portion or the second portion to compensate performance degradation as a function of the content presentation history of the first portion and the second portion. For example, if the electronic device is folded in half at a bend, step 1202 includes determining which portion of the display to either side of the bend needs remediation by operation as a function of the content presentation history. If, say, a user has used the portion of the display to the right of the bend substantially more than the portion to the left, the selection occurring at step 1202 will be to use the left portion.

At optional step 1203, a prompt can be presented on one portion of the display telling the user to use another portion of the display. For example, if the electronic device is folded in half at a bend, and a user is holding the folded device with the portion of the display to the right of the bend upward, a prompt may be presented on the portion to the right of the bend at step 1203 telling the user to turn the device over so that the portion of the display to the left of the bend can be used to create equal burn-in across both portions of the display. Accordingly, in one embodiment step 1203 comprises presenting a prompt on one portion of the display indicating that the content is to be presented on another portion of the display. At step 1204, the content is then presented on the selected portion of the display to cause the remediation.

Figure 13:
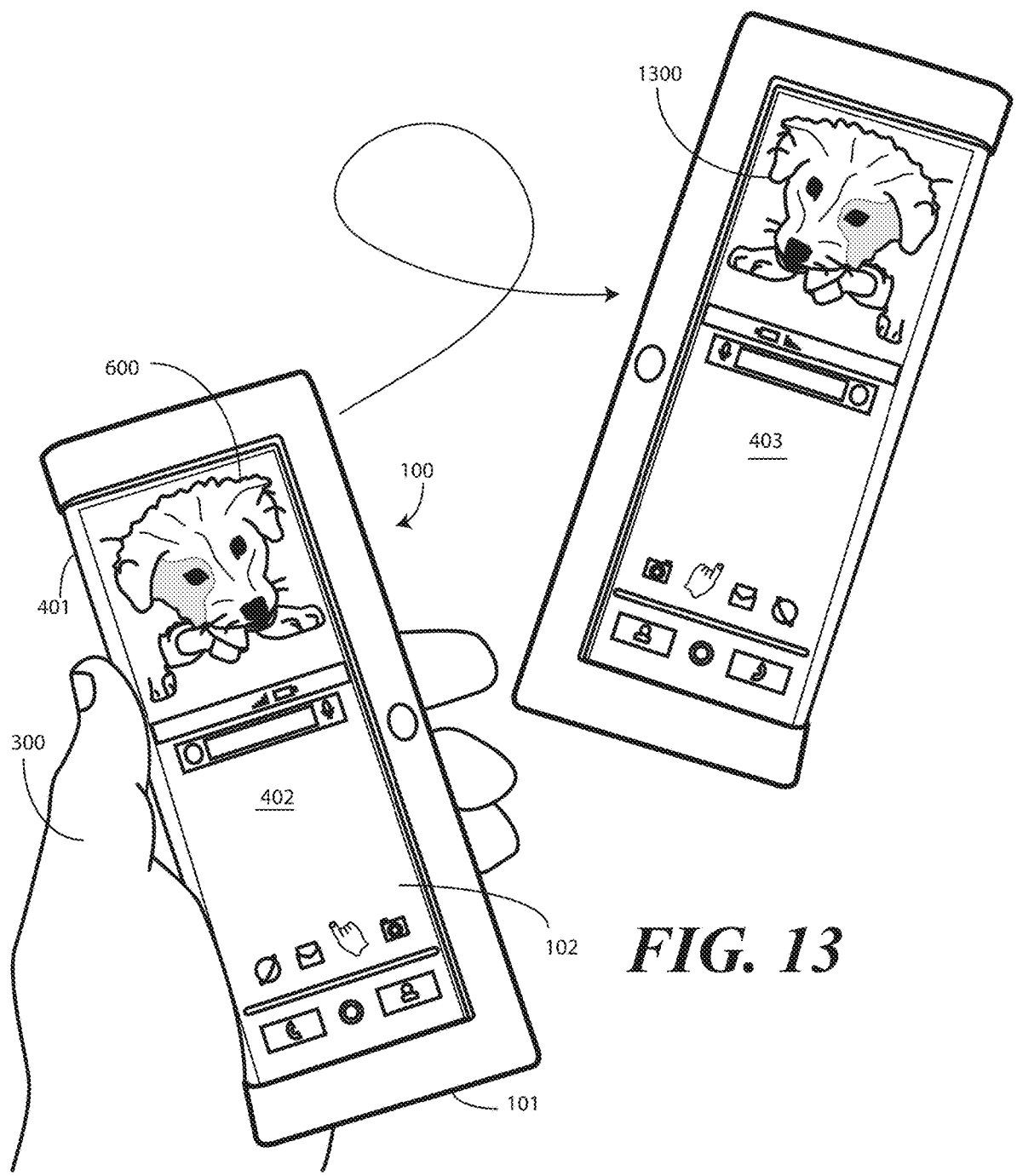
FIG. 13 illustrates one explanatory electronic device undergoing remediation to compensate performance degradation in accordance with one or more embodiments of the disclosure.
Figure 14:
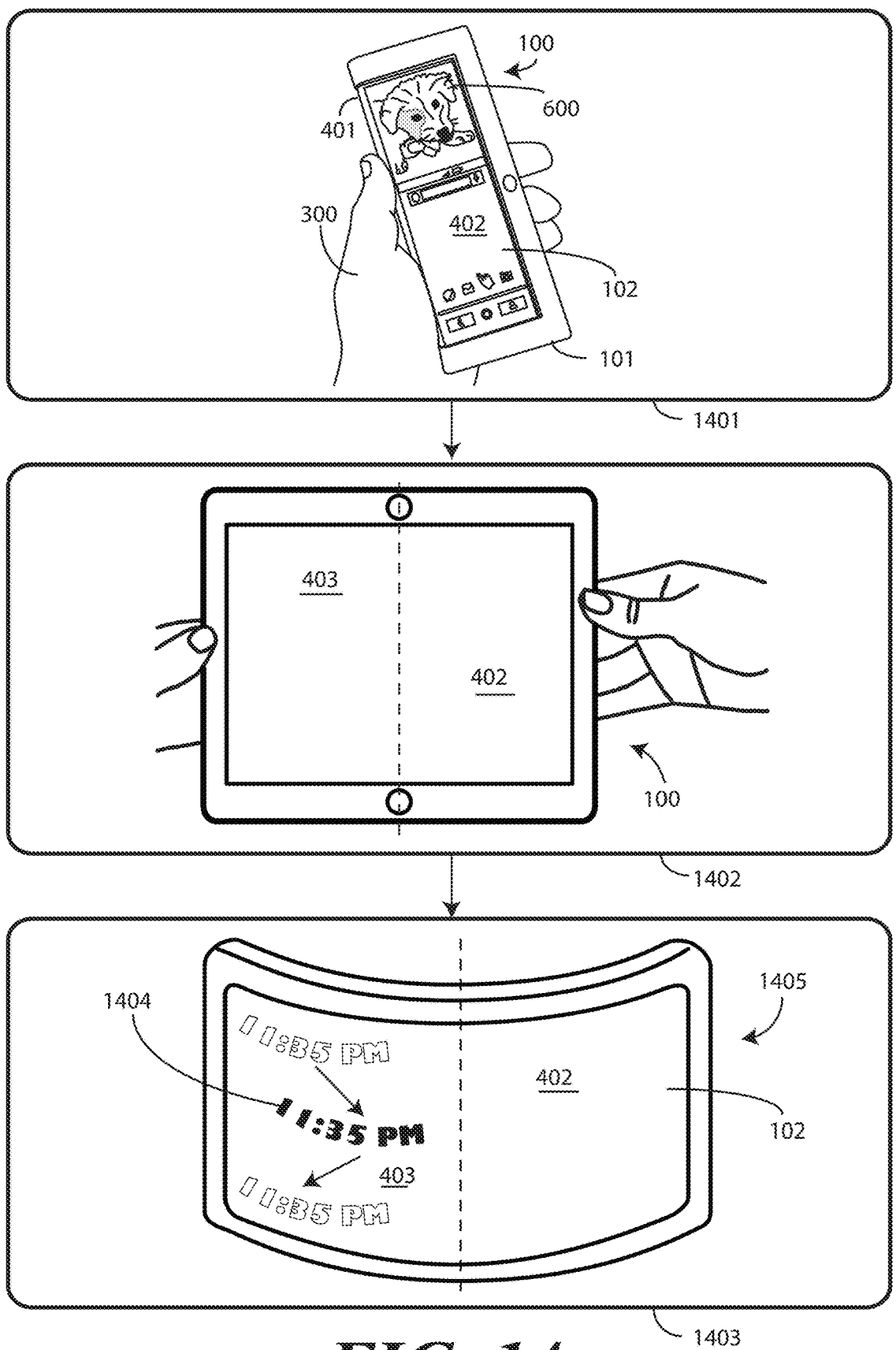
FIG. 14 illustrates one or more method steps in accordance with one or more embodiments of the disclosure.
Figure 15:
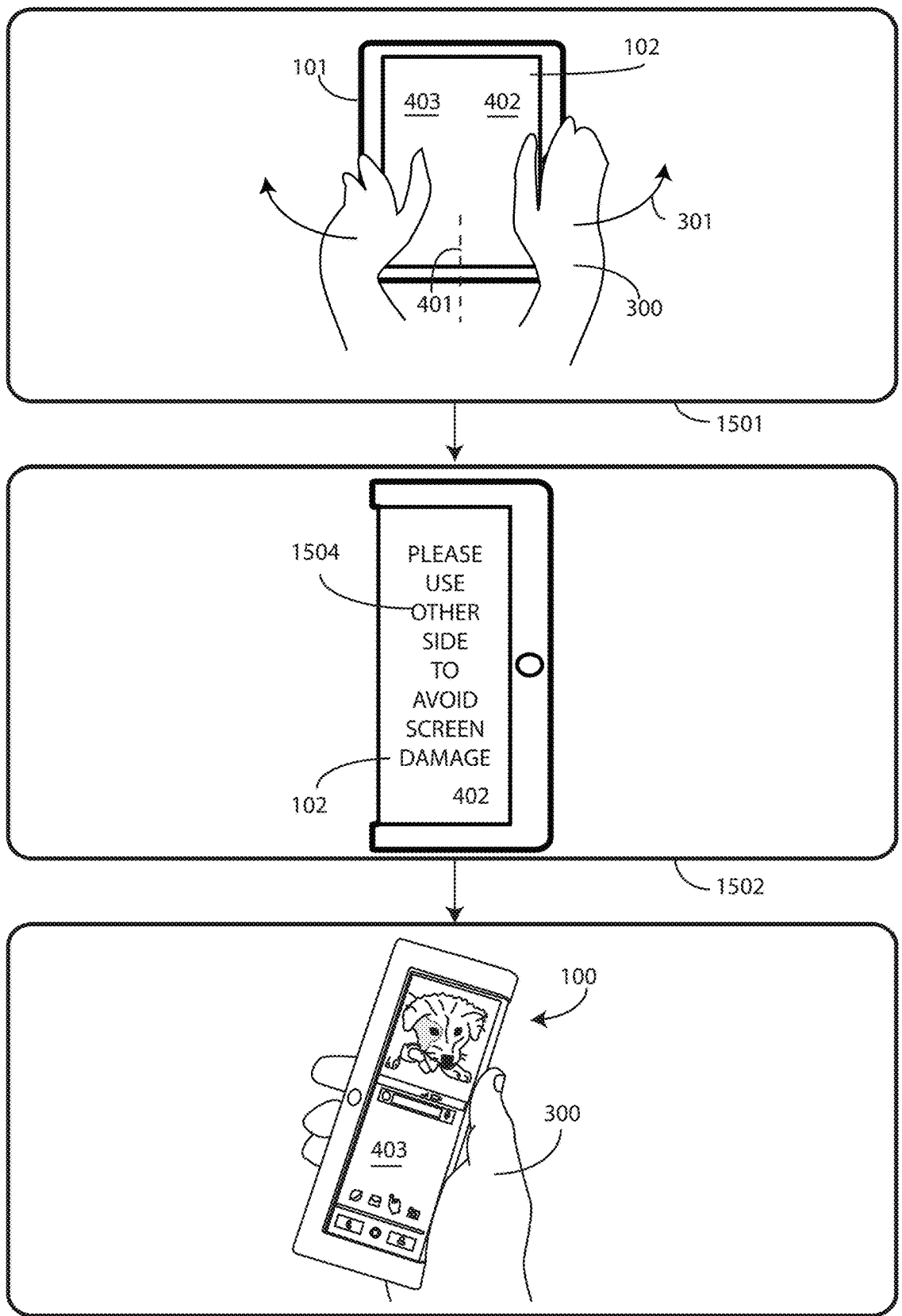
FIG. 15 illustrates one or more method steps in accordance with one or more embodiments of the disclosure.

Now that explanatory methods are understood, FIGS. 13-15 illustrate various use cases and method steps where remediation in accordance with embodiments of the disclosure is occurring. Beginning with FIG. 13, a user 300 is using an electronic device 100 in a folded configuration. The flexible display 102 of the electronic device 100 has been deformed by a bend 401. One or more flex sensors (112), supported by the deformable housing 101 of the electronic device 100, detect the deformation of the electronic device 100 and partition the flexible display 102 into a first portion 402 and a second portion 403. As shown in FIG. 13, one or more processors (116) of the electronic device 100 that are operable with the flexible display 102 and the flex sensors (112) are then presenting content 600 on the first portion 402 of the flexible display 102 in response to detecting the flexible display 102 being deformed.

In this illustrative embodiment, the one or more processors (116) are also remediating the second portion 403 of the flexible display 102 to compensate performance degradation of the flexible display resulting from presenting the content 600 on the first portion 402 of the flexible display 102. Specifically, in this use case the one or more processors (116) are remediating the second portion 403 of the flexible display 102 by presenting other content 1300 that is complementary to the content 600 on the second portion 403 of the flexible display 102. In this illustrative embodiment, the other content 1300 comprises a mirror image of the content 600. Additionally, in this illustrative embodiment the presenting and the remediating are occurring concurrently.

Turning now to FIG. 14, at step 1401 a user 300 is again using an electronic device 100 in a folded configuration. The flexible display 102 of the electronic device 100 has been deformed by a bend 401. One or more flex sensors (112), supported by the deformable housing 101 of the electronic device 100, detect the deformation of the electronic device 100 and partition the flexible display 102 into a first portion 402 and a second portion 403. One or more processors (116) of the electronic device 100 then present content 600 on the first portion 402 of the flexible display 102 in response to detecting the flexible display 102 being deformed.

While this is occurring, at step 1401 the one or more processors are monitoring a presentation characteristic of the content 600 while it is being presented. The presentation characteristic can be one or more of an ON time of the first portion 402, a brightness of the first portion 402, an ON pixel value of the first portion 402, or combinations thereof. In one embodiment, these presentation characteristics are stored as a presentation history in a memory (118) of the electronic device 100.

At step 1402, the user 300 bends the electronic device 100. In one or more embodiments, the one or more processors (116) of the electronic device 100 can then operate the electronic device 100 in a predefined mode of operation as a function of the deformed geometry created by the user 300. Advantageously, this allows the user 300 to control the operating mode by bending the electronic device 100 into a predefined shape. In one embodiment, a bent geometry that allows the electronic device 100 to stand on its side invokes a docked mode of operation 1405. As shown in step 1403, in one embodiment an alarm clock 1404 is presented on the flexible display 102 when in the docked mode of operation 1405. By bending the electronic device 100 into a predefined configuration, the user 300 can transform the electronic device 100 from the smartphone of step 1401 to the "docked" experience of step 1403 without the need for the docking hardware.

At step 1403, remediation of the second portion 403 is occurring. Specifically, one or more processors operable with the flexible display and the one or more flex sensors, the one or more processors (116) are remediating the second portion 403 of the flexible display 102 to compensate performance degradation of the flexible display 102 resulting from the presenting occurring at step 1401 of content 600 on the first portion 402 of the flexible display 102. In this illustrative embodiment, the remediating occurring at step 1403 is a function of the presentation characteristic monitored at step 1401.

Rather than being a mirror image of the content as was the case in FIG. 13, in this embodiment, the one or more processors (116) have created complementary content in the form of the alarm clock 1404 appearance that is in motion. In this illustrative embodiment, the alarm clock's motion is created as a function of the monitored presentation characteristics from step 1401. The movement causes the second portion pixels to emit brightness, color, and intensities of light so as to operate in a complementary fashion to the way the first portion 402 operated while being monitored at step 1401. To prevent one or more of loss of brightness or discoloration of the first portion 402 of the flexible display 102 relative to the second portion 403 of the flexible display 102 caused by non-uniform usage of the first portion 402 relative to the second portion 403, the one or more processors (116) move the alarm clock 1404 about the second portion 403 of the flexible display 102 to exercise the pixels so that each pixel gets the same amount of ON time, brightness, and/or pixel value that the first portion did when presenting the content 600 monitored at step 1401.

Turning now to FIG. 15, at step 1501 a user 300 is executing a bending operation 301 upon the electronic device 100 to impart deformation by bending. One or more processors (116) of the electronic device 100 detect that a bending operation 301 and partition the flexible display 102 into a first portion 402 and a second portion 403, with each portion being disposed on opposite sides of the single bend 401.

As shown at step 1502, the user plans to use the first portion 402 to view content when in the folded mode. However, in this embodiment the one or more processors (116) select one of the first portion 402 or the second portion 403 on which to present content so as to remediate one of the first portion 402 or the second portion 403 to compensate performance degradation as a function of a content presentation history of the first portion 402 and the second portion 403. In this illustration, the one or more processors (116) determine that the second portion 403 needs to be exercised to remediate it relative to the first portion 402. Accordingly, the one or more processors (116) present, at step 1502, a prompt 1504 on the first portion 402 indicating that the content is presented on the second portion 403 of the flexible display 102. Here, the prompt 1504 says, "Please use other side to avoid screen damage."

At step 1503, the user 300 then turns the electronic device 100 over so that the second portion 403 becomes visible. The one or more processors (116) then present the content 600 on the second portion 403 to remediate the same. The one or more processors (116) then cause the first portion 402 to enter a low-power or sleep mode of operation.

Figure 16:
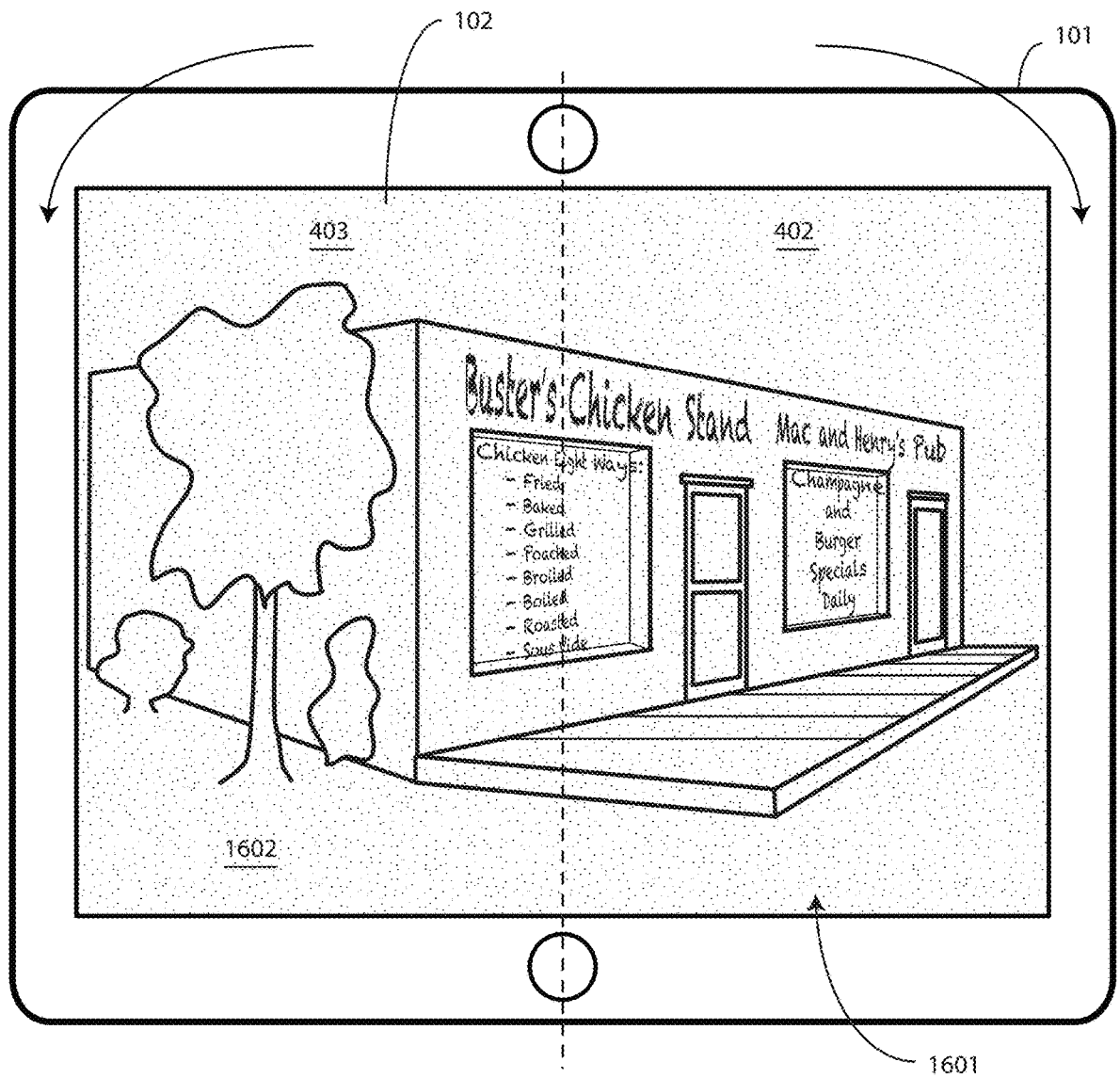
FIG. 16 illustrates one explanatory device in an undeformed configuration after to remediation in accordance with one or more embodiments of the disclosure.

Regardless of which method is used, e.g., the methods of any of FIGS. 8-15, the results of the remediation process are shown in FIG. 16. As shown in FIG. 6, the electronic device 100 has been unfolded so that the entire flexible display 102 can be used. Since the flexible display 102 has been used, some performance degradation 1601 has occurred. However, due to the remediation efforts, the performance degradation 1601 is uniform across the first portion 402 of the flexible display 102 and the second portion 403 of the flexible display 102. The result is achievement of a substantially equivalent visual appearance 1602 when the flexible display 102 is used in an undeformed configuration.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while bending was the primary mode of changing the geometry of an electronic device, other techniques, including squeezing, stretching, pulling, and shaking could also be used.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
   determining, with one or more processors, a portion of a flexible display disposed to one side of a bend in the flexible display and requiring remediation to compensate performance degradation of the flexible display resulting from presenting content more frequently to the one side of the bend or more frequently to another side of the bend; and
   remediating the portion of the flexible display.

2. The method of claim 1, further comprising presenting, with the one or more processors, the content on the portion of the flexible display disposed to the one side of the bend, and remediating another portion of the flexible display to the another side of the bend.

3. The method of claim 1, the presenting and the remediating occurring simultaneously.

4. The method of claim 3, further comprising transitioning portions of the flexible display disposed to the another side of the bend to a low-power or sleep mode of operation.

5. The method of claim 1, further comprising presenting a prompt to the another side of the bend, the prompt instructing content presentation on the portion to the one side of the bend.

6. The method of claim 1, further comprising detecting a docking operation transitioning an electronic device comprising the flexible display to a docked mode of operation, the remediating occurring during the docked mode of operation.

7. The method of claim 1, the remediating occurring as a function of a screen ON time of the portion of the flexible display disposed to the one side of the bend.

8. The method of claim 1, the remediating occurring as a function of a display brightness of the portion of the flexible display disposed to the one side of the bend.

9. The method of claim 1, the remediating occurring as a function of an ON pixel value for the portion of the flexible display disposed to the one side of the bend.

10. The method of claim 1, the remediating occurring as a function of a value for red, green, and blue pixels of the portion of the flexible display disposed to the one side of the bend when ON.

11. The method of claim 1, the remediating occurring while the content is being presented on the portion of the flexible display disposed to the one side of the bend.

12. The method of claim 1, the remediating comprising presenting complementary content on the portion of the flexible display disposed to the one side of the bend.

13. A method, comprising:
    determining, with one or more processors, a portion of a flexible display disposed to one side of a bend and requiring remediation to compensate performance degradation of the flexible display resulting from presenting content more frequently to the one side of the bend or more frequently to another side of the bend; and
    remediating the portion of the flexible display by presenting content on the portion of the flexible display.

14. The method of claim 13, the flexible display coupled to an electronic device, the remediating the portion of the flexible display occurring while the electronic device is in a docked mode of operation.

15. The method of claim 14, the docked mode of operation occurring when the electronic device is coupled to a charger, power supply, or docking station.

16. The method of claim 13, the flexible display coupled to an electronic device, the remediating the portion of the flexible display occurring while the electronic device is bent into a predefined geometrical configuration.

17. The method of claim 13, the flexible display coupled to an electronic device, the remediating the portion of the flexible display occurring when the electronic device is stationary.

18. The method of claim 13, the flexible display coupled to an electronic device, the remediating the portion of the flexible display occurring while the electronic device is in a low-power or sleep mode.

19. The method of claim 13, the content comprising complementary content to monitored content previously presented on the portion.

20. The method of claim 19, wherein the complementary content and the monitored content are the same.

* * * * *